United States Patent [19]
Bernoni

[11] Patent Number: 5,584,628
[45] Date of Patent: Dec. 17, 1996

[54] DEVICE FOR CONNECTING PARTS HAVING HOLES WITH DIFFERENT CENTER-TO-CENTER DISTANCES

[75] Inventor: Claudio Bernoni, Abano Terme, Italy

[73] Assignee: Ruote O.Z. S.p.A., Bassano del Grappa, Italy

[21] Appl. No.: 480,187

[22] Filed: Jun. 7, 1995

[30] Foreign Application Priority Data

Jun. 14, 1994 [IT] Italy ................... BO94A0277

[51] Int. Cl.⁶ ............... F16B 27/00; F16B 33/00
[52] U.S. Cl. ............... 411/84; 411/368; 411/533; 411/537; 301/35.62
[58] Field of Search ............... 411/84, 85, 368, 411/369, 432, 533, 537; 301/35.62, 35.54, 35.57

[56] References Cited

U.S. PATENT DOCUMENTS

| | | | |
|---|---|---|---|
| 2,597,835 | 5/1952 | Ekserglan | 301/35.62 |
| 3,171,518 | 3/1965 | Bergmann | 411/537 X |
| 3,779,610 | 12/1973 | Pansky et al. | 301/35.62 |
| 3,988,038 | 10/1976 | Hedlund | 301/35.62 |
| 5,326,206 | 7/1994 | Moore | 411/537 X |

*Primary Examiner*—Neill R. Wilson
*Attorney, Agent, or Firm*—Darby & Darby, P.C.

[57] ABSTRACT

The device for connecting parts having holes with different center-to-center distances consists of a threaded connecting element, such as a bolt or a nut, and a bush whose internal diameter is greater than the diameter of the bolt shank or of a threaded shank associated to the the nut; if used for fitting vehicle wheels, a bolt may be inserted into the holes in the wheel, with the bush snapped onto the base of the bolt head from below, and the bolt then screwed into the corresponding threaded hole in the axle hub, the difference between the center-to-center distance of the holes in the wheel and that of the threaded holes in the vehicle axle hub being compensated by the play created by the difference between the diameter of the bush and that of the bolt.

3 Claims, 2 Drawing Sheets

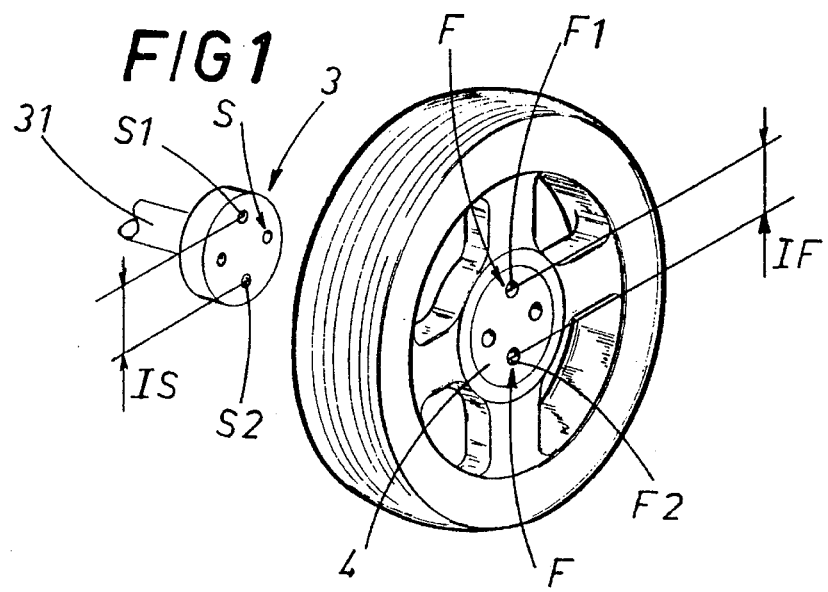
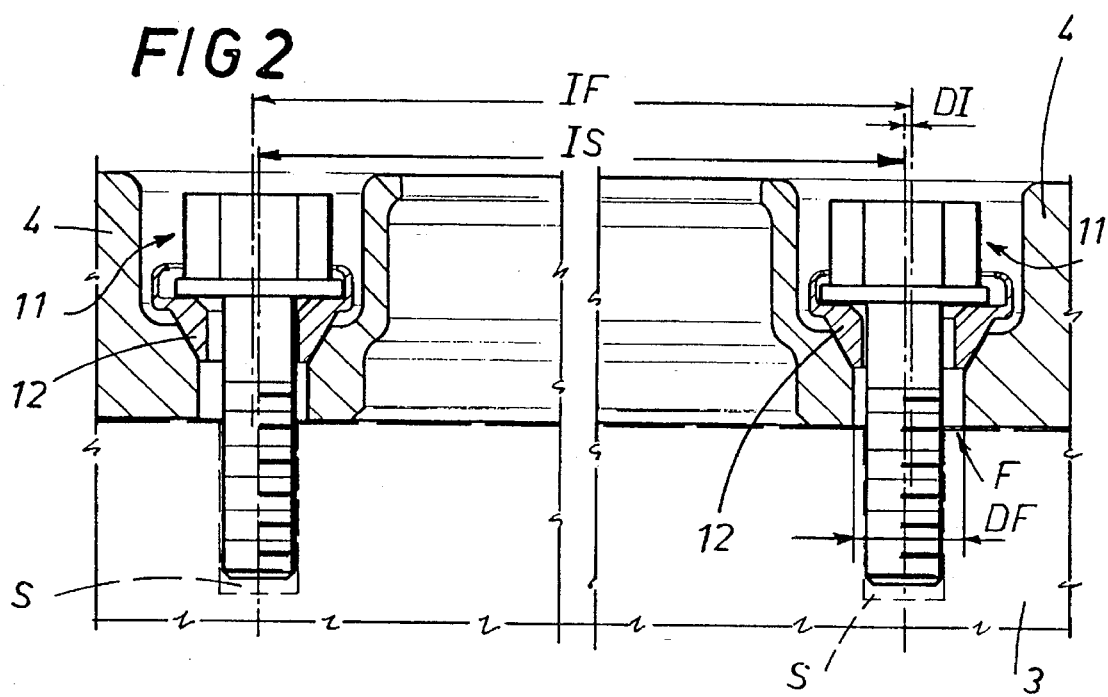

DEVICE FOR CONNECTING PARTS HAVING HOLES WITH DIFFERENT CENTER-TO-CENTER DISTANCES

BACKGROUND OF THE INVENTION

The present invention concerns a device for connecting parts having holes with different center-to-center distances, that is to say, a device that may be used to connect a first part to a second part, using bolts or similar threaded elements, in those cases where the distance between at least two bolt holes in the first part is different from the corresponding distance between two holes in the second part.

The parts which may be connected are mechanical elements and a preferred embodiment of the invention is used for fitting wheels to vehicle axle hubs.

Motor vehicle wheels have a plurality of holes, usually from three to five, distributed along the circumference of a circle whose center is the center of the wheel; on a plate (commonly known as "hub"), attached and perpendicular to the axle, there is a plurality of threaded holes corresponding to the holes in the wheel; the wheel is held to the axle hub by retaining bolts inserted through the holes in the wheel and screwed into the threaded holes in the hub.

The configurations of the holes in the wheel and hub differ from one motor vehicle make to another, and even from one model to another, depending on design choices made in response to functional and aesthetic requirements.

The differences consist not only in the number of holes in the wheel (and of the corresponding threaded holes in the hub) but also in the center-to-center distance between one hole and another in the wheel (or between two corresponding threaded holes in the hub).

Basically, the radius of the circle, along whose circumference the holes in the wheel are arranged, may differ from that of the threaded holes in the axle hub.

At present, it is not possible to fit wheels with holes whose centers are at a given distance from each other to vehicles whose axle hubs have holes whose centers are at a different distance from each other, even if the difference is minimal.

The aim of the present invention is to overcome the drawback just mentioned and thus to enable two mechanical parts to be bolted together even if the distance between the centers of the bolt holes in one part differs from that between the centers of the bolt holes in the other part.

SUMMARY OF THE INVENTION

This aim is achieved by the device disclosed whose function is to enable parts having holes with different center-to-center distances to be bolted to one another.

The device consists of a threaded connecting element, such as a bolt or a nut, and a bush whose internal diameter is greater than the diameter of the bolt shank or of the nut; in a preferred embodiment used for fitting vehicle wheels, the bolt is inserted into the holes in the wheel, the bush snapped onto the base of the bolt head from below and the bolt then screwed into the corresponding hole in the axle hub, the difference between the center-to-center distance of the holes in the wheel and that of the holes in the vehicle axle hub being compensated by the play created by the difference between the diameter of the bush and that of the bolt. If the device includes a nut, it is the nut itself which creates play within the bush so that it can be screwed onto a threaded shank protruding from or inserted into one of the holes in the axle hub.

One of the advantages of the present invention is that it allows wheels to be fitted to motor vehicle axle hubs even in those cases where the center-to-center distance between the holes for the retaining bolts in the wheel differs from that between the holes in the axle hub into which the retaining bolts are to be screwed.

This advantage applies not only in those cases where the distance between the centers of the holes in the wheel is greater than that of the holes in the axle hub but also where, on the contrary, the holes in the axle hub are further apart than those in the wheel.

In the preferred embodiment, applied to motor vehicle wheels, used hereafter as a non-restrictive example to describe the invention, the differences between the center-to-center distances between the holes in the two parts to be joined are of a few millimetres, a significant measurement if considered in relation to the dimensions concerned, namely center-to-center distances in the order of $10^2$ millimetres and wheel and axle hub hole diameters in the order of $10^1$ millimetres. Obviously, these values may vary according to the size of the parts concerned.

BRIEF DESCRIPTION OF THE DRAWINGS

Further characteristics and advantages of the invention are apparent from the detailed description which follows, with reference to the accompanying drawings, which illustrate preferred embodiments of the invention by way of example and in which:

FIG. 1 is a schematic perspective view of a possible application of the present invention;

FIG. 2 is a side view, with parts shown in cross section and others cut away, of an embodiment of the invention, applied to a motor vehicle wheel;

DESCRIPTION OF THE PREFERRED EMBODIMENTS

Figure 3:
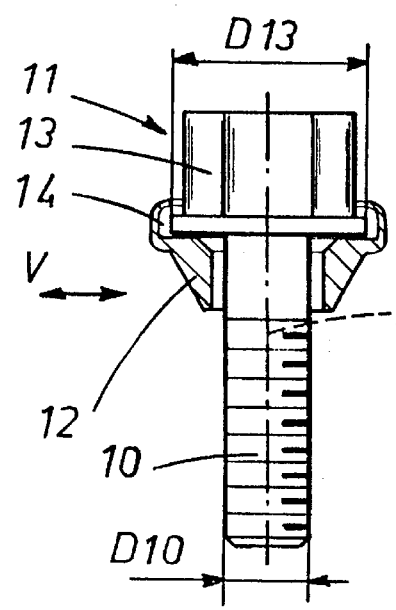
FIG. 3 is a side view, with parts shown in cross section, of a device embodying the present invention and consisting of a bolt and bush assembly.
Figure 4:
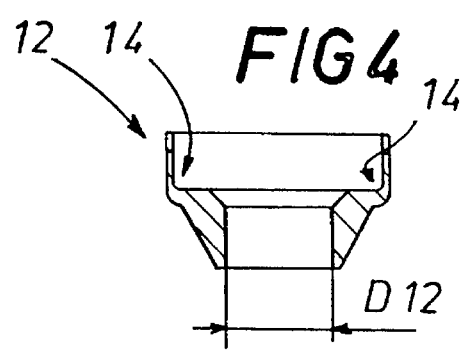
FIG. 4 is a view in cross-section of a bush forming part of the device illustrated in FIG. 3.

The invention will now be described with reference to the drawings listed above which illustrate preferred embodiments of the invention used for fitting wheels to the axle hubs of motor vehicles. The device illustrated in FIGS. 2 to 4, for connecting parts having holes with center-to-center distances that do not match exactly, comprises a bolt 11 and a bush 12.

The bolt has a head 13, used as a grip for tightening or slackening the bolt itself, and a shank 10 threaded complementarily with respect to a first hole S1 and a second hole S2 in a first plurality of holes S made in a first part 3 to be connected; in the example illustrated, the first part 3 is a hub 3 attached to an axle 31, shown only partially and schematically.

The shank 10 has a diameter D10 which is smaller than a first diameter (DF) of a first hole F1 and a of a second hole F2 in a second plurality of holes F made in a second part 4 which, in the example illustrated, is a wheel 4 to be connected to the hub 3.

The first threaded hole S1 and the second threaded hole S2 are spaced apart by a first distance IS which differs from a second distance IF between the first hole F1 and the second hole F2 in the wheel 4.

The bush 12, which in the illustration has the shape of a truncated cone, has an internal diameter D12 that is smaller than the diameter D13 of the head 13 of the bolt 11 and larger than the diameter D10 of the shank 10 of the bolt itself by a value equal to the difference DI between the first distance IS (between the centers of the threaded holes S in the hub) and the second distance IF (between the centers of the holes F in the wheel). This arrangement makes it possible for at least two bolts to pass through the first hole F1 and the second hole F2 and to be screwed, respectively, into the first threaded hole S1 and the second threaded hole S2 in the axle hub 3.

In the case of a motor vehicle, there are obviously more than two holes in the wheel and more than two threaded holes in the axle hub and, in practice, the device embodying the present invention (labelled 1 as a whole) causes the bolt to be shifted inwards or outwards in relation to the hole F through which it passes.

For example, if the center-to-center distance IS between the threaded holes S in the axle hub is smaller than the center-to-center distance IF between the holes F in the wheel, the bolts will be shifted towards the inside of the wheel.

The bush 12 has an annular seat 14 designed to accommodate the head 13 of the bolt 11 in such a way that the latter can rotate while being held firmly in the direction R of the bolt axis A and allowed play in a direction V perpendicular to the axis A by an amount not smaller than the difference DI between the first center-to-center distance IS and the second center-to-center distance IF.

The annular seat 14 has a curved rim, obtainable by chamfering for example, designed to be snapped onto a corresponding rim of the head of the bolt 11 so as to make it easier for the device 1 to be fitted and holding the bolt 11 to the bush 12.

Figure 5:
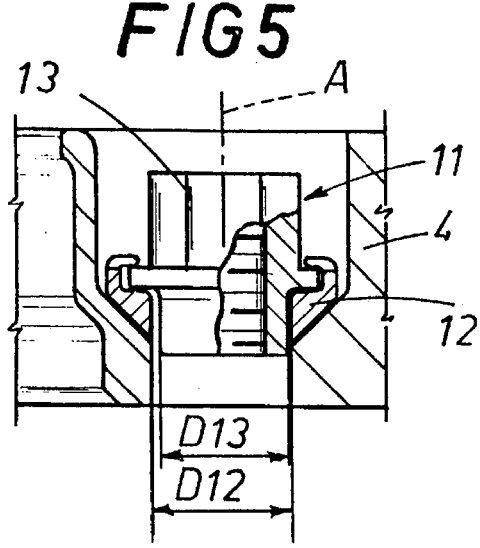
FIG. 5 is a side view, with parts shown in cross section and others cut away, of a device embodying the present invention and consisting of a nut and bush assembly.

FIG. 5 shows an embodiment of the invention wherein a bush 12, similar to that of the embodiment described above, is associated with a nut 11 with a head 13; the connection between the nut 11 and the bush 12 is comparable to that in the embodiment described above, between the bush 12 and the head 13 of the bolt 11. Obviously, to be able to connect two parts, the nut 11 must be screwed onto a corresponding threaded shank, not illustrated in FIG. 5, which may form part of the hub (or other part be connected) or which may be screwed into a hole in the hub itself (or in another part to be connected).

The internal diameter D12 of the bush 12 is greater than the external diameter D13 of the nut 11 so as to provide the play necessary to connect parts each with at least two holes at a distance from each other different from the distance between the two corresponding holes in the other part.

The invention described can be subject to modifications and variations without thereby departing from the scope of the inventive concept. Moreover, all the details of the invention may be substituted by technically equivalent elements.

What is claimed:

1. An assembly for attaching a first article, such as a wheel, having a plurality of first holes arranged in a first pattern with a first predetermined spacing therebetween to a second article, such as a hub, having a plurality of threaded second holes of lesser diameter than the first holes of said first article arranged in said first pattern but with a spacing therebetween different from said first predetermined spacing, said assembly comprising:

a bushing for fitting into a first hole of said first article, said bushing having;
  a through hole and having a lower part for fitting into a first hole of said first article and engaging the wall surrounding the first hole,
  a flat upper surface transverse to said through hole, and
  a retaining element on the periphery of the flat upper surface having a first leg extending upwardly from said upper surface and a second leg spaced from said upper surface and inwardly of said first leg toward said bushing through hole;

a bolt having a head with a surrounding flange at its bottom and a threaded shank extending downwardly from said head, said threaded shank having a diameter corresponding to the diameter of a threaded second hole of the second article and being of smaller diameter than the through hole of the bushing, the lower surface of said surrounding flange of the bolt head seating on the bushing upper surface with the second leg of the bushing retaining element overlying the upper surface of said bolt head flange to capture the bolt to the bushing and permit movement of the bolt shank within said bushing through hole in a direction transverse thereto as the shank is to mate with and be threaded into the second hole.

2. An assembly as in claim 1 wherein at least the part of the wall of said first article forming a first hole thereof is chamfered, said bushing lower part being tapered in a shape to engage the chamfer of the first article wall to firmly seat the bushing in the first hole.

3. An assembly as in claim 2 wherein said bushing lower part is of generally fructo-conical shape.

\* \* \* \* \*

UNITED STATES PATENT AND TRADEMARK OFFICE
CERTIFICATE OF CORRECTION

PATENT NO. : 5,584,628
DATED : December 17, 1996
INVENTOR(S) : Claudio BERNONI

It is certified that error appears in the above-indentified patent and that said Letters Patent is hereby corrected as shown below:

Title page, [30], Foreign Application Priority Data, change "BO94A0277" to --BO94A 000277--.

Signed and Sealed this

Twenty-ninth Day of April, 1997

Attest:

BRUCE LEHMAN

*Attesting Officer*   Commissioner of Patents and Trademarks